June 11, 1946. G. J. SELLMEYER 2,401,972
MEAT CUTTING MACHINE
Filed March 23, 1943 3 Sheets-Sheet 1
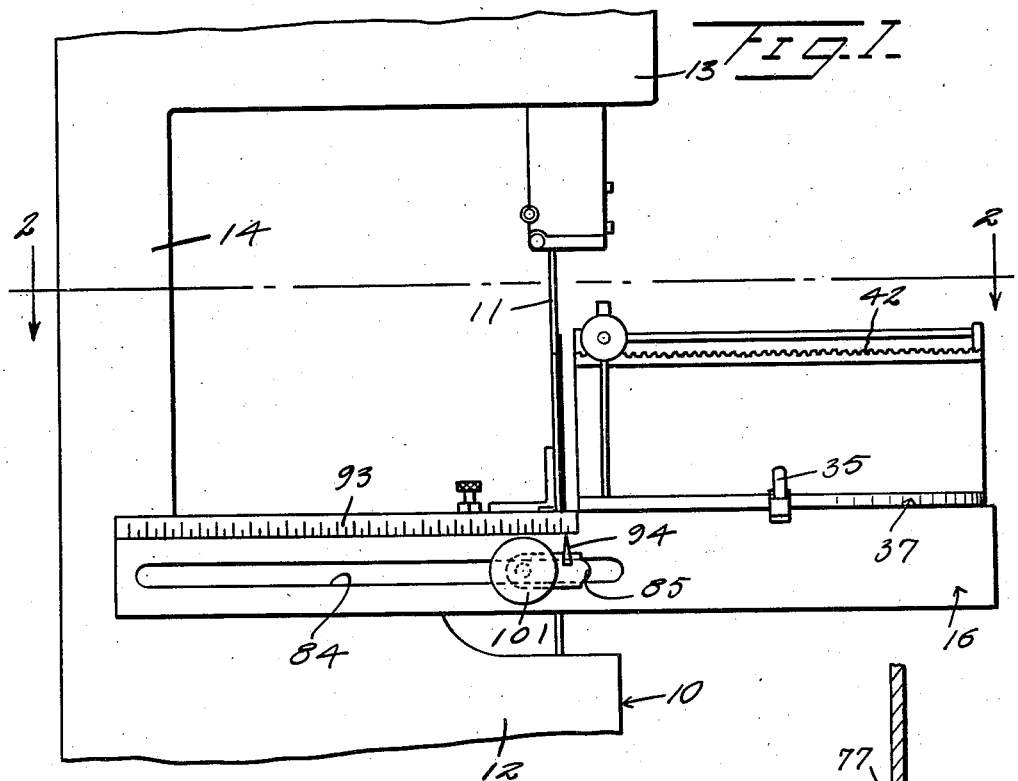
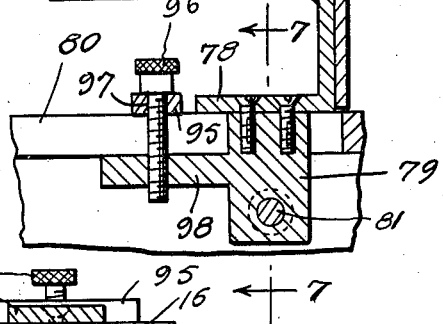
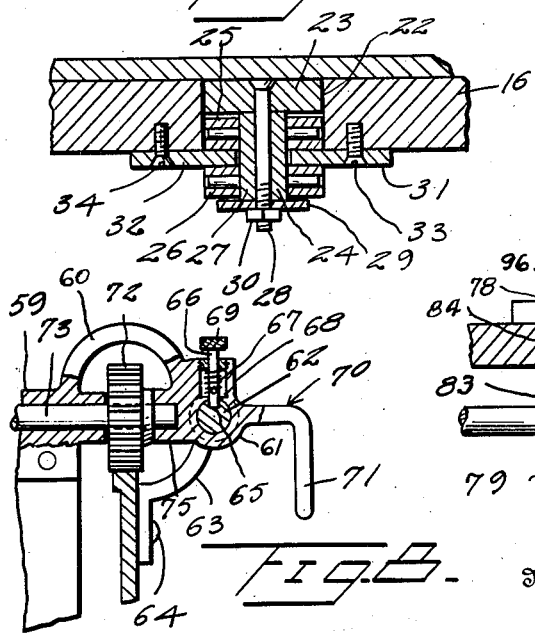
Inventor
G. J. Sellmeyer
By Kimmel & Crowell
Attorneys

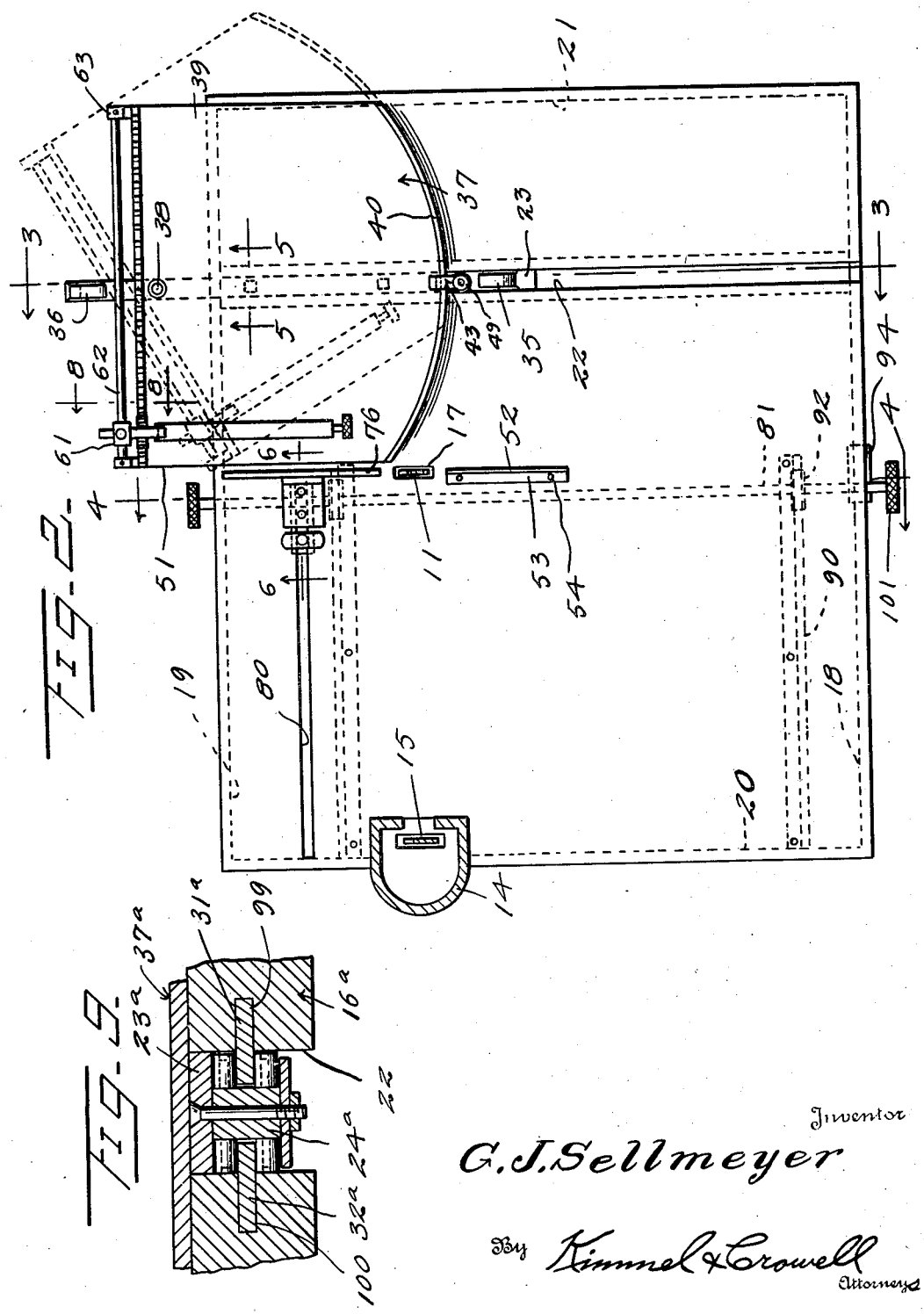

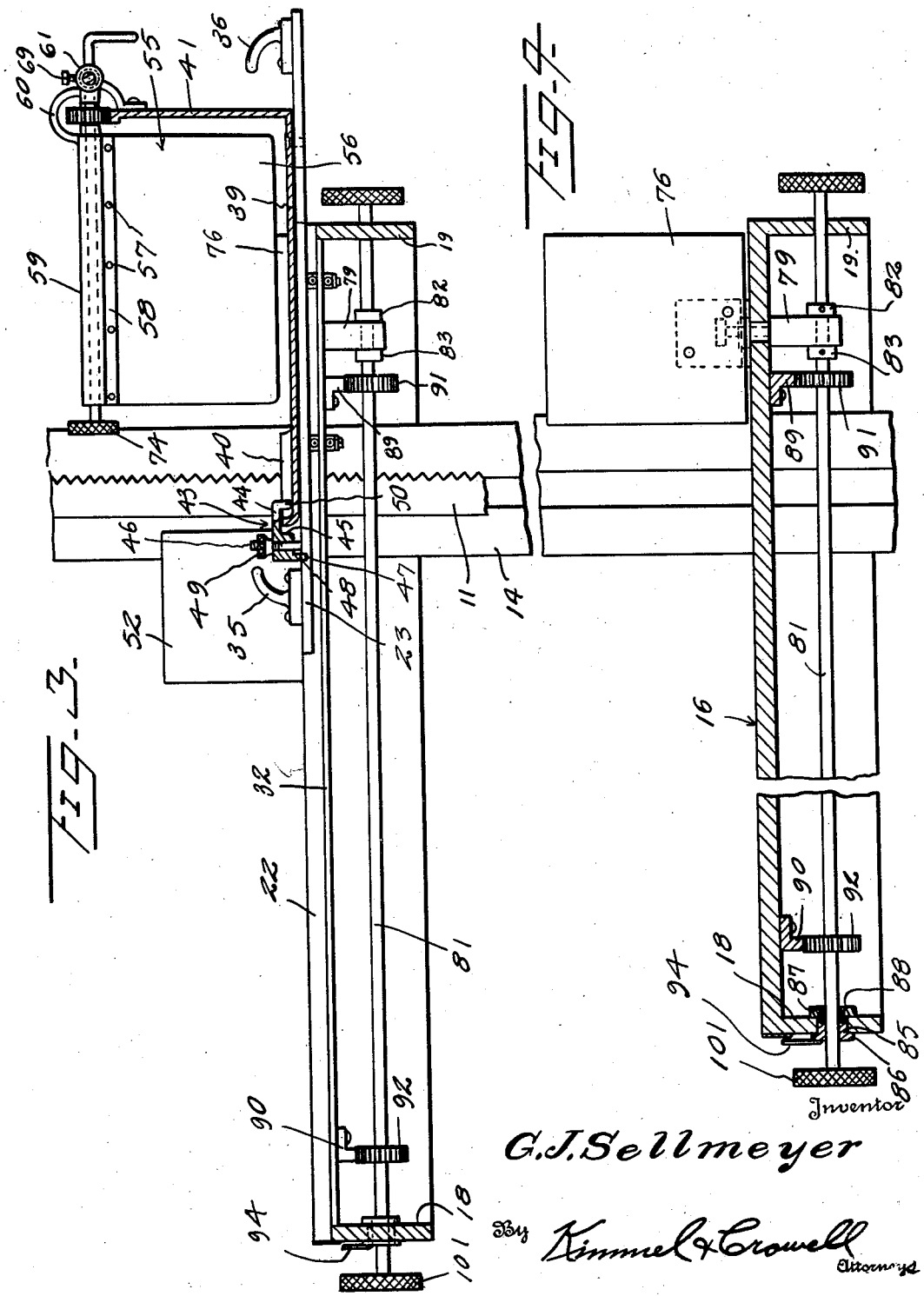

Patented June 11, 1946

2,401,972

UNITED STATES PATENT OFFICE 2,401,972

MEAT CUTTING MACHINE

Gilbert J. Sellmeyer, Indianapolis, Ind.

Application March 23, 1943, Serial No. 480,225

5 Claims. (Cl. 146—88)

This invention relates to meat cutting machines.

An object of this invention is to provide a meat cutter embodying the use of a band saw and manually operated means for moving the meat past the saw.

Another object of this invention is to provide a meat cutter embodying a stationary splitter for separating the sliced or cut meat from the uncut meat.

A further object of this invention is to provide a meat cutting means which may be made as an attachment to a band saw.

A further object of this invention is to provide in combination with a band saw, a carriage for moving the meat past the saw, the carriage including a meat shifting means for shifting the meat on the carriage toward the saw, and an adjustable device for determining the thickness of the slice cut from the meat.

A further object of this invention is to provide a carriage which is movable on a table, the carriage being movable parallel with the saw, and also being adjustable angularly relative to the saw so that angled cuts may be made in the meat.

A further object of this invention is to provide a carriage for a meat cutter having an improved operating means for shifting the meat on the carriage, the operating means being manually adjustable, and also capable of being moved to an inoperative position to permit the initial trimming of a large piece of meat or for other purposes.

A further object of this invention is to provide an improved guide means for the meat carriage so as to permit the use of either a metal or wooden table.

With the foregoing objects and others which may hereinafter appear, the invention consists of the novel construction, combination and arrangement of parts as will be more specifically referred to and as illustrated in the accompanying drawings wherein are shown embodiments of the invention, but it is to be understood that changes, modifications and variations may be resorted to which fall within the scope of the invention as claimed.

In the drawings:

Figure 1 is a fragmentary front elevation of a meat cutting device, constructed according to an embodiment of this invention, Figure 2 is a sectional view taken on the line 2—2 of Figure 1, Figure 3 is a sectional view taken on the line 3—3 of Figure 2, Figure 4 is a sectional view taken on the line 4—4 of Figure 2, Figure 5 is a fragmentary sectional view taken on the line 5—5 of Figure 2, Figure 6 is a fragmentary sectional view taken on the line 6—6 of Figure 2, Figure 7 is a sectional view taken on the line 7—7 of Figure 6, Figure 8 is a fragmentary sectional view taken on the line 8—8 of Figure 2, and Figure 9 is a fragmentary sectional view of a modified form of table and guide structure.

Referring to the drawings, the numeral 10 designates generally a frame structure of a cutting means which, in the present instance, is in the form of an endless band saw 11 which is mounted on the usual wheels (not shown) and driven by a suitable driving means. The frame structure 10 includes a lower frame structure 12, an upper frame structure 13 and a connecting post or standard 14 which, in the present instance, is hollow and through which the outer run 15 of the saw or cutting means 11 travels.

A table generally designated as 16 is secured in a horizontal position to the frame 10 and is provided with an opening 17 through which the outer or cutting run of the saw 11 loosely travels. The table 16 is provided with forward and rear depending flanges 18 and 19, respectively, and with opposite end flanges 20 and 21. The table 16 is formed with an elongated slot or guide passage 22 which is parallel with the saw or cutting means 11 and is spaced outwardly therefrom. An elongated slide bar 23 is slidable in the slot 22 and has secured at spaced points therealong a pair of depending roller structures 24. The roller structures 24 include an upper pair of rollers 25 and a lower pair of rollers 26. The pairs of rollers are rotatably carried by a sleeve or bearing member 27 which is secured by means of a bolt 28 to the lower side of the slide bar 23.

A lower plate or washer 29 is interposed between the lower end of the sleeve 27 and the nut 30 which is threaded onto the lower end of the bolt 28. The table 16 has secured to the lower side thereof a pair of spaced apart parallel guide bars 31 and 32 which are secured to the underside of the table 16 by fastening bolts or screws 33 and 34, respectively. The guide bars 31 and 32 engage between the upper and lower rollers and provide a means for facilitating the sliding movement of the slide bar 23 in addition to providing a means whereby the slide bar 23 cannot be accidentally lifted out of the guide slot 22. The slide bar 23 has secured to the forward end thereof an upstanding handle 35 and also has secured to the rear end thereof a second upstanding handle 36.

A carriage generally designated as 37 is secured to the slide bar 23 by means of a pivot bolt 38. The carriage 37 includes a lower plate 39 which is formed at its forward edge with an upturned arcuate rim portion 40. The carriage 37 at its rear is formed with an upstanding rear wall 41 which may be formed integral with the lower horizontal plate 39, and the rear wall or plate 41 at its upper edge is formed with gear teeth 42. The carriage 37 may be adjusted about the pivot member 38 to position the rear wall 41 at any desired angle with respect to the slide bar 23 and is clamped in its adjusted position by means of a clamping member 43.

The clamping member 43 includes a bar 44 provided with a boss 45 at its forward end through which a bolt 46 fixedly carried by the slide member 23 is adapted to loosely engage. The boss 45 is also provided with a downwardly extending pin or stud 47 engaging in a recess 48 formed in the upper side of the slide bar 23. A thumb nut 49 is threaded onto the bolt 46 so that the clamping member 43 may be maintained in a clamping position. The rear end of the clamping bar 44 is formed with a downturned lip 50 engaging rearwardly or inwardly of the upturned arcuate edge 40 of the plate 39. Tightening of the nut 49 will press the clamping lip or jaw 50 against the upper side of the plate 39 so as to tightly clamp the plate 39 against the upper side of the slide member 23.

The meat which is to be cut by the cutting means or saw 11 is placed on top of the carriage 37 against the upstanding rear wall 41. A portion of the meat is adapted to project inwardly from the inner edge 51 of the carriage 37 and forward pull of the slide bar 23 will cause the meat to be cut by the saw 11. An upstanding splitter 52 which is formed with a base portion 53 is secured by fastening means 54 to the upper side of the table 16 with the splitter 52 in edgewise alignment with the edge of the saw 11 on the back side of the saw 11. In the present instance the splitter 52 is forwardly of the saw 11, it being understood that the carriage is moved from a rear to a foremost position during the cutting operation.

In order to provide a means whereby the meat on the carriage 37 may be shifted inwardly towards the saw 11, I have provided a shifting means generally designated as 55. The shifting means 55 includes a rectangular plate 56 which is secured by fastening means 57 to a depending flange 58 carried by an elongated tubular member 59. The tubular member 59 is connected by means of an arcuate connecting bar 60 to a sliding bearing or sleeve 61. The bearing or sleeve 61 is slidably mounted on a horizontal guide bar 62 which is secured to a pair of rearwardly projecting brackets or supporting members 63 fixed to the rear side of the rear wall 41 adjacent the upper portion of the latter by means of fastening members 64. The guide bar 62 is formed in the upper side thereof with an elongated longitudinal groove or keyway 65 within which a spring pressed latching pin 66 is adapted to releasably engage. The latching pin 66 is constantly urged to a latching position within the groove 65 by means of a spring 67 engaging in a housing 68 carried by and extending upwardly of the bearing sleeve 61. When the knob 69 carried by the upper end of the latching pin 66 is raised so as to withdraw the pin 66 from the groove 65, the meat shifting member 55 may be raised upwardly to an inoperative position, and the degree of upward swinging of the meat shifting member 55 is limited by an L-shaped stop member 70 formed integral with the bearing sleeve 61 and having a depending side 71 which may engage the rear wall 41 to limit the swinging of the shifting member 55 to an inoperative position.

The shifting member 55 is adapted to be shifted transversely of the carriage 37 by means of a gear 72 which is fixed to a shaft 73. The gear 72 is adapted, when the shifting member 55 is in a horizontal position and with the latching member 66 in a latched position, to mesh with the toothed rack 42 on the upper side of the rear wall 41. The shaft 73 is rotatably disposed through the tubular member 59 and is formed at its outer end with an operating knob 74. The inner end of the shaft 73 is journalled in a bearing boss 75 which may be formed integral with the bearing sleeve 61, as shown in Figure 8.

In order to provide a means whereby the thickness of the cut may be gauged and accurately determined, I have provided a gauge structure including a gauge plate 76 which is disposed in a vertical position on the upper side of the table 16. The plate 76 is secured to an L-shaped supporting member 77 and the lower horizontal side 78 of the supporting member 77 is secured to a slide block 79. The slide block or member 79 loosely engages through an elongated slot 80 formed in the table 16 inwardly of the saw 11. The slot 80 is disposed at right angles to the slot 22 and is positioned such that the upstanding gauge member 76 will be positioned rearwardly of the saw 11 which, in the present instance, has the cutting teeth thereof on the rear edge. The gauge member 76 is adapted to be shifted along the length of the slot 80 by means of a shaft 81. The shaft 81 is extended through and journalled in the depending block 79 and is held against endwise movement relative to the block 79 by means of a pair of collars 82 and 83. The shaft 81 extends parallel with the lower side of the table 16 and terminates at its forward end beyond the front flange 18.

The shaft 81 is extended through an elongated horizontal guide slot 84 which is formed in the front flange 18, and preferably a sliding bearing 85 is disposed in the slot 84. The bearing 85 is formed with upper and lower front flanges 86 and a rear plate 87 may be secured by fastening means 88 to the rear side of the bearing 85. The rear plate 87 is substantially wider than the width of the slot 84, thereby forming rear upper and lower flanges so that the sliding bearing 85 will be held against forward or rearward movement, but may freely slide lengthwise in the guide opening or slot 84.

The table 16 has secured to the lower side thereof a pair of parallel toothed racks 89 and 90 and the shaft 81 has secured thereto a pair of gears 91 anad 92 meshing with the racks 89 and 90. The front side of the forward flange 18 is formed with a series of graduations or gauge marks 93 and a pointer 94 is secured to the sliding bearing 85 and is correlated with the graduations 93 so as to indicate the position of the gauge member 76 with relation to the saw 11. The gauge member 76 may be clamped in adjusted position by means of a clamping bar 95 which is clamped against the upper side of the table 16 by means of a clamping bolt 96. The clamping bolt 96 extends loosely through an opening 97 formed in the bar 95 and also extends loosely through the slot 80. The lower portion of the clamping bolt or bar tensioning member 96 is threaded into a laterally projecting arm 98 which is carried by the slide member 79. The arm 98 is substantially wider than the width of the slot 80 so that tightening of the bolt 96 will clamp the arm 98 and the bar 95 against the lower and upper sides respectively of the table 16.

Referring now to Figure 9 there is disclosed fragmentarily a table structure 16a which, in the present instance, is formed of wood. The table 16a is formed with a guide opening or slot 22a within which the slide bar 23a is adapted to slidably engage. A carriage 37a similar in every detail to the carriage 37 is secured to the slide bar 23a. In order to slidably mount the slide bar 23a with the roller structure 24a in the table 16a, I have provided a pair of guide bars 31a and 32a which are mounted in confronting grooves 99 and 100 cut into the opposite sides of the slot 22a between the upper and lower surfaces of the table 16a. In other respects the structure shown in Figure 9 is identical with that hereinabove described and the gauge structure hereinbefore described may also be used with the modification shown in Figure 9.

In the use and operation of this cutting means, the meat may be placed on the base plate 39 of the carriage 37. If the piece of meat is to be cut on an angle the carriage 37 may be swung outwardly to, as an example, the dotted line position shown in Figure 2 and clamped in this position by the clamping member 43. Where the piece of meat is a very large piece, the shifting member 55 may initially be raised from engagement with the meat. The carriage 37 may then be pulled by grasping the forward handle 35 and pulling the carriage 37 forwardly past the saw 11.

If desired the operator may stand at the rear side of the machine, grasping the handle 36 and pushing the carriage forwardly. Where the carriage 37 is in the full line position, shown in Figure 2, the meat shifting member 55 may be moved to the right or outwardly and away from the saw 11 so that the meat may be placed on the carriage 37 inwardly of the shifting member 55. The gauge member 76 may be set by turning the knob 101 on the forward end of the gauge shaft 81 and the gauge member 76 is clamped or locked in adjusted position by the clamping bar 95. As the carriage 37 moves past the saw 11 with the meat thereon, the splitter or divider 52 will cause the cut slice to drop away from the carriage 37.

This device may be made as an attachment for a conventional band saw, it only being necessary to mount the table 16 on the frame structure 10 of the conventional saw. This meat cutting attachment may be used for either raw or cooked meat and by having the cutting side of the saw 11 rearwardly the operator being on the forward side of the saw will not accidentally contact the cutting edge of the saw and be injured thereby.

What I claim is:

1. In a meat cutting means a movable meat carriage formed of a horizontal bottom plate and an upstanding rear wall, a toothed rack carried by the upper edge of said rear wall, a meat shifting member, a guide bar carried by said rear wall adjacent the upper portion thereof, a sleeve slidable on said bar, a tubular member fixed to said sleeve and extending over said bottom plate, means securing said meat shifting member to said tubular member, a shaft rotatable in said tubular member, and a gear fixed to said shaft and meshing with said rack, rotation of said shaft effecting movement of said meat shifting member.

2. In a meat cutting means a movable meat carriage formed of a horizontal bottom plate and an upstanding rear wall, a toothed rack carried by the upper edge of said rear wall, a meat shifting member, a guide bar carried by said rear wall adjacent the upper portion thereof, a sleeve slidable on said bar, a tubular member fixed to said sleeve and extending over said bottom plate, means securing said meat shifting member to said tubular member, a shaft rotatable in said tubular member, a gear fixed to said shaft and meshing with said rack, rotation of said shaft effecting movement of said meat shifting member, and correlated means carried by said sleeve and said bar for latching said sleeve against rotary movement.

3. In a meat cutting means a movable meat carriage formed of a horizontal bottom plate and an upstanding rear wall, a toothed rack carried by the upper edge of said rear wall, a meat shifting member, a guide bar carried by said rear wall adjacent the upper portion thereof, a sleeve slidable on said bar, a tubular member fixed to said sleeve and extending over said bottom plate, means securing said meat shifting member to said tubular member, a shaft rotatable in said tubular member, a gear fixed to said shaft and meshing with said rack, rotation of said shaft effecting movement of said meat shifting member, said bar having an elongated groove therein, and a spring-pressed latching pin carried by said sleeve engaging in said groove for holding said sleeve against rotation while permitting endwise movement of the latter.

4. In a meat cutting means a movable meat carriage formed of a horizontal bottom plate and an upstanding rear wall, a toothed rack carried by the upper edge of said rear wall, a meat shifting member, a guide bar carried by said rear wall adjacent the upper portion thereof, a sleeve slidable on said bar, a tubular member over said bottom plate and disposed at right angles to said sleeve, an arched member connecting said sleeve and tubular member together, means securing said meat shifting member to said tubular member, a shaft rotatable in said tubular member, and a gear fixed to said shaft and meshing with said rack, rotation of said shaft effecting movement of said meat shifting member.

5. In a meat cutting means a movable meat carriage formed of a horizontal bottom plate and an upstanding rear wall, a toothed rack carried by the upper edge of said rear wall, a meat shifting member, a guide bar carried by said rear wall adjacent the upper portion thereof, a sleeve slidable on said bar, a tubular member over said bottom plate and disposed at right angles to said sleeve, an arched member connecting said sleeve and tubular member together, means securing said meat shifting member to said tubular member, a shaft rotatable in said tubular member, and a gear engaging said rack fixed to said shaft between the adjacent end of said tubular member and said sleeve and positioned within the arch of said arched member rotation of said gear effecting movement of said meat shifting member.

GILBERT J. SELLMEYER.